US011089501B1

(12) United States Patent
Monajemi et al.

(10) Patent No.: US 11,089,501 B1
(45) Date of Patent: Aug. 10, 2021

(54) NETWORKED SLEEP MODE MANAGEMENT

(71) Applicant: Cisco Technology, Inc., San Jose, CA (US)

(72) Inventors: Pooya Monajemi, Irvine, CA (US); Vishal S. Desai, San Jose, CA (US); Santosh B. Kulkarni, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/750,994

(22) Filed: Jan. 23, 2020

(51) Int. Cl.
*H04W 28/02* (2009.01)
*H04W 52/02* (2009.01)
*H04L 12/801* (2013.01)

(52) U.S. Cl.
CPC ......... *H04W 28/0221* (2013.01); *H04L 47/11* (2013.01); *H04W 28/02* (2013.01); *H04W 28/0273* (2013.01); *H04W 28/0289* (2013.01); *H04W 52/0216* (2013.01); *H04W 52/0219* (2013.01); *H04W 52/0229* (2013.01); *Y02D 30/00* (2018.01)

(58) Field of Classification Search
CPC ......... H04W 28/0273; H04W 28/0289; H04W 52/0212; H04W 52/0267; H04W 28/0221; H04W 52/0219; H04L 1/16
See application file for complete search history.

(56) References Cited

U.S. PATENT DOCUMENTS 9,191,891 B2   11/2015  Jafarian et al.
9,743,351 B2    8/2017  Jafarian et al.
10,271,282 B2   4/2019  Wilhelmsson et al.
10,362,625 B2   7/2019  Kela et al.
2014/0153390 A1  6/2014  Ishii et al.
2016/0183187 A1  6/2016  Park
2018/0359704 A1* 12/2018  Li ..................... H04W 52/0219
2019/0045445 A1*  2/2019  Huang ............... H04W 72/0446
2019/0297575 A1  9/2019  Seok et al.
(Continued)

FOREIGN PATENT DOCUMENTS

WO   2018171048 A1   9/2018
WO   2019169387 A1   9/2019

OTHER PUBLICATIONS

Yoshiwaka et al, "Wake-up Channel Selection for On-Demand WiFi Wake-up using WLAN Signals", IEEE, 2014 (Year: 2014).*

(Continued)

*Primary Examiner* — Omer S Mian
(74) *Attorney, Agent, or Firm* — Patterson + Sheridan, LLP (57) ABSTRACT

Networked sleep mode management is provided by measuring network conditions for a first Access Point serving a plurality of client devices configured to operate in one of a sleep mode and an active mode; in response to detecting an amount of network usage devoted to transitioning members of the plurality of client devices from the sleep mode to the active mode satisfies a threshold: identifying a first subset of client devices from the plurality of client devices that are in the sleep mode; identifying a given client device from the first subset of client devices to transition to the active mode; and transmitting a tear-down message to the given client device that instructs the given client device to transition from the sleep mode to the active mode.

20 Claims, 6 Drawing Sheets

(56) References Cited

U.S. PATENT DOCUMENTS

2020/0287816 A1* 9/2020 Chandrasekaran ........................ H04L 43/0811
2020/0344005 A1* 10/2020 Komoriya ......... H04W 28/0231

OTHER PUBLICATIONS

PCT, Notification of Transmittal of the International Search Report and The Written Opinion of The International Searching Authority, or Declaration for Application No. PCT/US2021/070066, dated May 21, 2021.

* cited by examiner

NETWORKED SLEEP MODE MANAGEMENT

TECHNICAL FIELD

Embodiments presented in this disclosure generally relate wireless network management. More specifically, embodiments disclosed herein provide for management of when devices are permitted to enter a sleep mode.

BACKGROUND

In a networking environment, Access Points (APs) provide wireless network connectivity to various Client Devices (CD) such as laptops, cell phones, etc. To save battery life, a CD may go into sleep mode and deactivate the main radio used to communicate with the AP. When the AP has a message for a CD in sleep mode, the AP transmits a wakeup signal (WUS) to a secondary radio in the CD (which uses less power than the main radio) to signal the CD to reactivate the main radio. Unfortunately, these wakeup signals consume bandwidth that could be used for messages that carry actual data, as well as other WUSs for other CDs—which can lead to network congestion or high latency when several CDs need to awaken from sleep mode in a high-traffic environment.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure provides a method for networked sleep mode management that includes: measuring network conditions for a first Access Point (AP) serving a plurality of CDs (Client Devices) configured to operate in one of a sleep mode and an active mode; in response to detecting an amount of network usage devoted to transitioning members of the plurality of CDs from the sleep mode to the active mode satisfies a threshold: identifying a first subset of CDs from the plurality of CDs that are in the sleep mode; identifying a given CD from the first subset of CDs to transition to the active mode; and transmitting a tear-down message to the given CD that instructs the given CD to transition from the sleep mode to the active mode.

One embodiment presented in this disclosure provides a computer readable storage device including instructions for networked sleep mode management that when performed by a processor perform an operation comprising: measuring network conditions for a first Access Point (AP) serving a plurality of CDs (Client Devices) configured to operate in one of a sleep mode and an active mode; in response to detecting an amount of network usage devoted to transitioning members of the plurality of CDs from the sleep mode to the active mode satisfies a threshold: identifying a first subset of CDs from the plurality of CDs that are in the sleep mode; identifying a given CD from the first subset of CDs to transition to the active mode; and transmitting a tear-down message to the given CD that instructs the given CD to transition from the sleep mode to the active mode.

One embodiment presented in this disclosure provides a device for managing networked sleep mode, comprising: a processor; and a memory storage device including instructions that when executed by the processor enable the processor to perform an operation that includes: measuring network conditions for a first Access Point (AP) serving a plurality of CDs (Client Devices) configured to operate in one of a sleep mode and an active mode; in response to detecting an amount of network usage devoted to transitioning members of the plurality of CDs from the sleep mode to the active mode satisfies a threshold: identifying a first subset of CDs from the plurality of CDs that are in the sleep mode; identifying a given CD from the first subset of CDs to transition to the active mode; and transmitting a tear-down message to the given CD that instructs the given CD from the sleep mode to the active mode.

Example Embodiments

The present disclosure provides for managing when to allow or deny various CD in a network to enter sleep mode and force/instruct sleeping CDs to transition to the active mode (also referred to as an awake/wake mode) based on currently observed networking conditions at the AP, at neighboring APs, and/or predicted network conditions (e.g. using machine learning to anticipate congested network conditions). To help reduce power consumption and physical sizes of the wake-up radios used to manage when a CD leaves sleep mode, the WUS frames use very low data rates, but are transmitted in the same frequency bands as the active signals. The WUS frames can therefore take a long time to transmit (in some cases, approximately 1 millisecond), which can cause congestion in dense networks or networks that are otherwise attempting to use the bandwidth for control or data frames or to wake several sleeping devices at the same time. Therefore, select devices are given preferential access to the sleep mode to mitigate over-occupation of airtime for WUS frames.

Figure 1A:
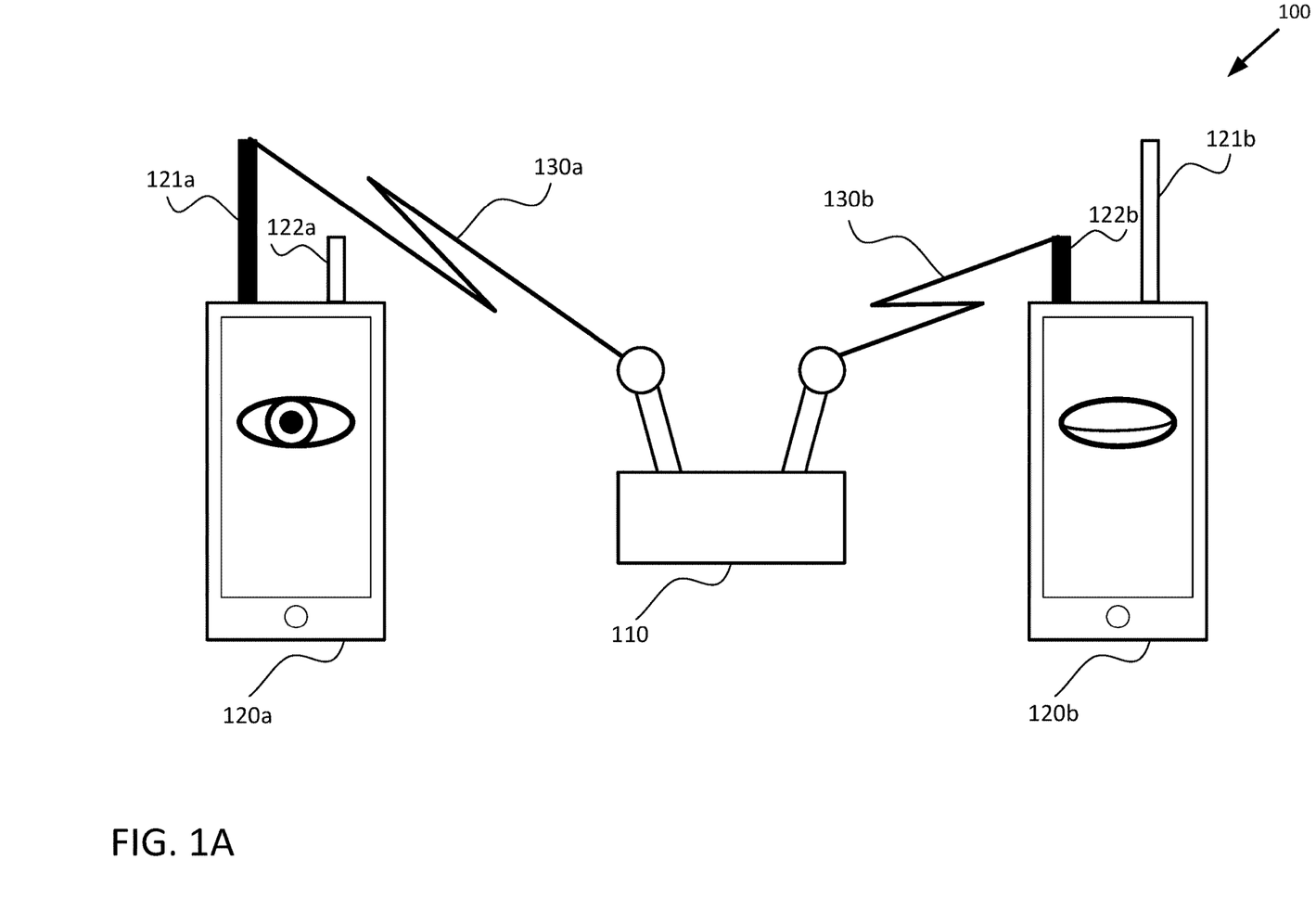
FIGS. 1A-1C illustrate a networking environment, according to embodiments of the present disclosure.
Figure 1B:
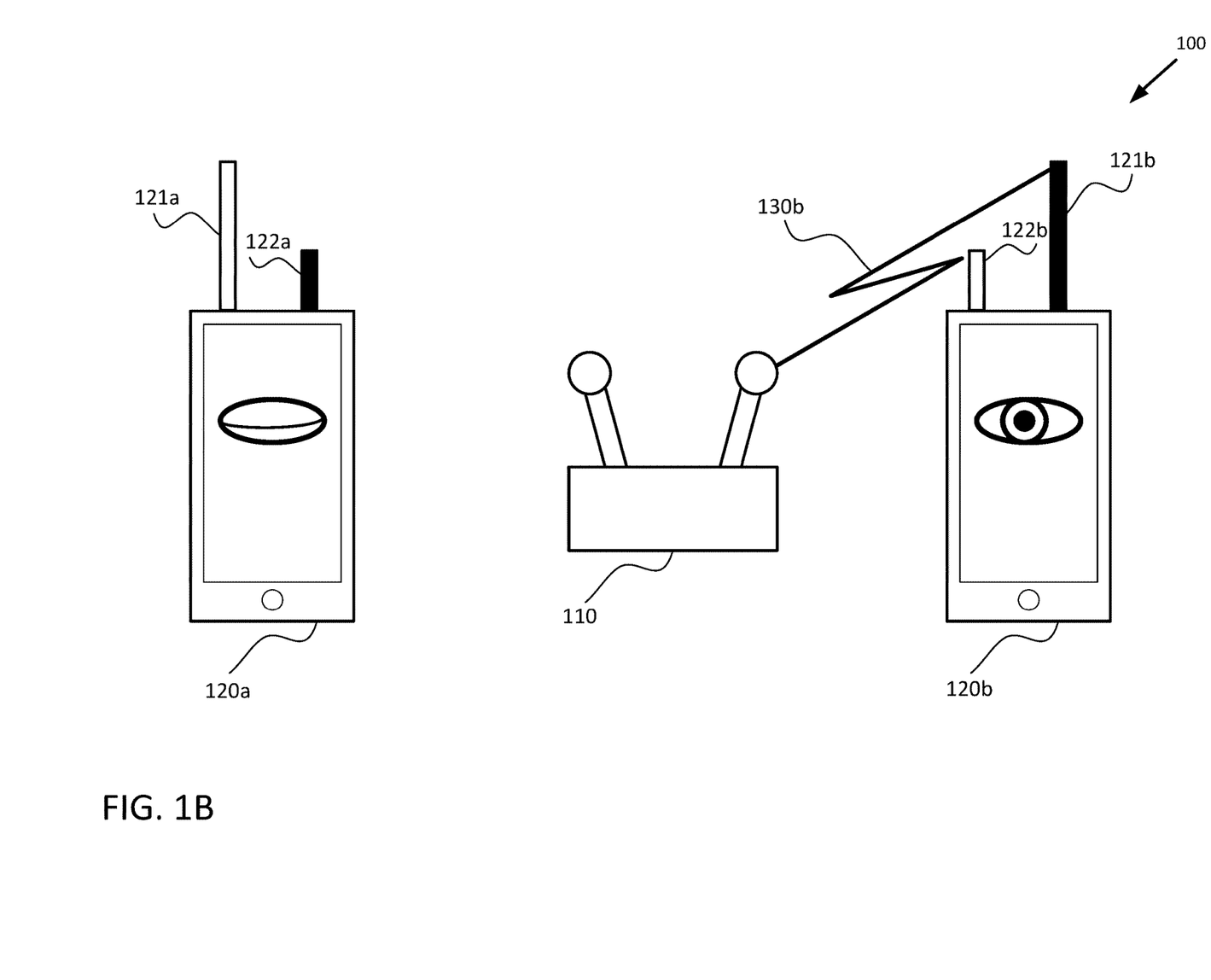
Figure 1C:
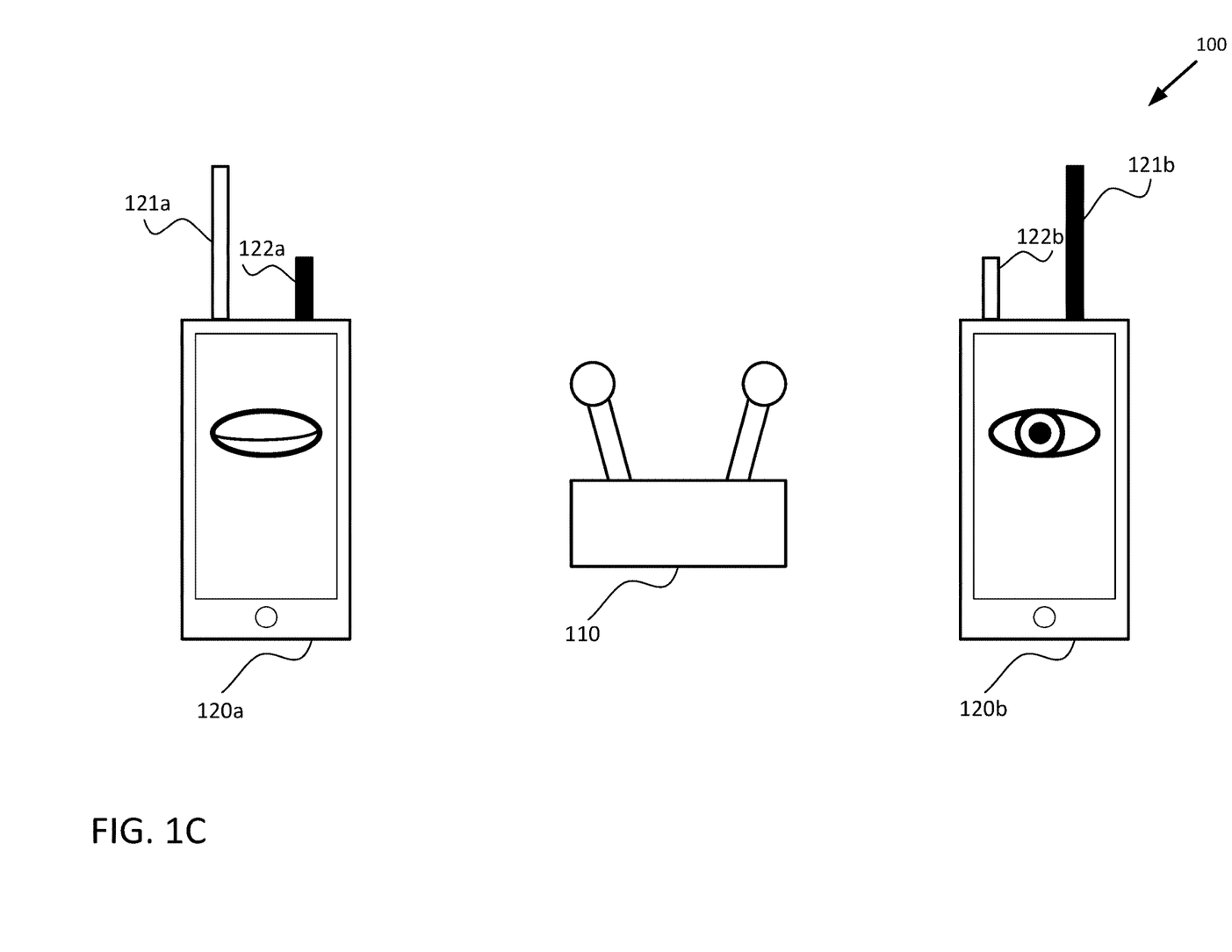

FIGS. 1A-1C illustrate a networking environment 100, according to embodiments of the present disclosure. In each of FIGS. 1A-1C, an AP 110 provides network connectivity for a first CD 120a (generally, CD 120) and a second CD 120b. In various embodiments, the AP 110 may provide a shared network in the networking environment with other APs that serve other CDs, and may serve more than or fewer than two CDs 120. FIGS. 1A-1C may be understood individually to illustrate the operation of the AP 110 and CDs 120 in the networking environment, and may also be understood in series (i.e., from FIG. 1A through FIG. 1C) to show the CDs 120 being permitted or denied the ability to enter or remain in a sleep mode.

The AP 110 may include various networking devices configured to provide wireless networks according to various networking standards or Radio Access Technologies (RAT) (e.g., IEEE 802.11 or "WiFi" networks, BLUETOOTH® networks, "cellular" (including various generations and subtypes thereof, such as Long Term Evolution (LTE) and Fifth Generation New Radio (5G NR)) networks, Citizens Broadband Radio Service (CBRS) networks, proprietary networks). Example hardware as may be included in an AP 110 is discussed in greater detail in regard to FIG. 4.

Similarly, CD 120 may include any computing device that is configured to wirelessly connect to one or more APs 110. Example CDs 120 can include, but are not limited to: smart phones, feature phones, tablet computers, laptop computers, desktop computers, Internet of Things (IoT) devices, and the like. Example hardware as may be included in a CD 120 is discussed in greater detail in regard to FIG. 4.

As illustrated in FIGS. 1A-1C, the CD 120 include at least two radios for communicating with the AP 110. The first CD 120a includes a first main radio 121a (generally, main radio 121) and a first wake-up radio 122a (generally, wake-up radio 122), similarly, the second CD 120b includes a second main radio 121b and a second wake-up radio 122b. The main radio 121 is active while the CD 120 is in an active mode (also referred to the CD 120 being "awake") to send or receive data to the AP 110. The wake-up radio 122 is active while the CD 120 is in a sleep mode (also referred to the CD 120 being "asleep"). To conserve power, the CD 120 generally deactivates the main radio 121 when in the sleep mode and deactivates the wake-up radio 122 when in the active mode. Although illustrated with separate antennas, the main radio 121 and the wake-up radio 122 may share one antenna, but use different signal processing hardware that are switched between to activate/deactivate the respective radios.

The sleep and active modes are defined according to various wireless communications standards, but generally allow the CD 120 to conserve power when data transmissions are not expected within a given time period; allowing the CD 120 to power down power-hungry components. The CD 120 may also power on various components that are energy efficient to allow the CD 120 to know when to leave sleep mode and return to the active mode (also referred to as waking up the CD 120). For example, a wake-up radio 122 that generally requires less power to operate than the main radio 121, can be activated to allow the CD 120 to save power while in the sleep mode and still receive communications to know when to return to the active mode. However, a wake-up radio 122 may be less efficient at receiving data than the main radio 121. Accordingly, the decision to use one of the main radio 121 or the wake-up radio 122 is a tradeoff between power efficiency and data throughput rate.

The first CD 120a begins in the active mode in FIG. 1A, transitions to a sleep mode in FIG. 1B, and remains in the sleep mode in FIG. 1C. When in the active mode, the first CD 120a activates the first main radio 121a to communicate with the AP 110 via first transmissions 130a (generally, transmission 130). The transmission 130 can include uplink and downlink communications to transfer data, control messages, etc., either to the AP 110 from the first CD 120a or to the first CD 120a from the AP 110. For example, the first transmissions 130a may include a sleep request from the first CD 120a to the AP 110 to indicate that the first CD 120a wishes to enter the sleep mode. The AP 110 may respond in another transmission 130 with an acknowledgment (accepting or denying the sleep request) from the AP 110 to the first CD 120a.

Once the AP 110 accepts the sleep request from the first CD 120a and includes a sleep command or an acceptance response to the sleep request in the first transmissions 130a, the first CD 120a can enter the sleep mode, as in shown in FIG. 1B. When entering the sleep mode, the first CD 120a deactivates the first main radio 121a and activates the first wake-up radio 122a. The first CD 120a may remain in the sleep mode for a predefined amount of time (e.g., as indicated in the sleep command or acceptance response from the AP 110), until the AP 110 sends a Wake Up Signal (WUS) to the first CD 120a via the first wake-up radio 122a, until the first CD 120a hands-off to a new AP, or until the CD 120a determines to initiate an uplink communication with the AP 110.

The second CD 120b begins in the sleep mode in FIG. 1A, transitions to an active mode in FIG. 1 B, and remains in the active mode in FIG. 1C. When in the sleep mode, the second CD 120b activates the second wake-up radio 122b to listen for a second transmission 130b addressed to the second CD 120b that includes a WUS from the AP 110. On receipt of a WUS, the second CD 120b transitions from the sleep mode to the active mode, and activates the second main radio 121b (and deactivates the second wake-up radio 122b) to send and receive second transmissions 130b with the AP 110.

In some embodiments, the determination to transition the second CD 120b to the active mode (e.g., as from FIG. 1A to FIG. 1B) may be made in response to the AP 110 having a message or data queued for downlink to the second CD 120b. However, the determination to transition the second CD 120b to the active mode can also be made based on network conditions indicating that allowing the second CD 120b to remain in the sleep mode may result in congestion or other aberrant behaviors across the network or individual devices. For example, because transmitting WUS frames consumes bandwidth that could be used for other transmissions 130, the AP 110 may determine that overall network performance may be improved if fewer devices are allowed to enter sleep mode, and thus fewer WUS will be needed to be transmitted in the future. In another example, if the second CD 120b transitions back and forth between the active/sleep mode, the overall data throughput rate may be lower than if the second CD 120b remained in the active mode, even when not actively sending/receiving data, due to not needing to wait for and process one or more WUS frames. Accordingly, such as is illustrated in FIG. 1C, the AP 110 may manage the first CD 120a to be in the sleep mode, and the second CD 120b to be in the active mode, even when the AP 110 is not actively communicating with either CD 120.

In FIG. 1C, the first CD 120a is prioritized for access to the sleep mode and the second CD 120b is deprioritized for access to the sleep mode. Although neither the first CD 120a nor the second CD 120b are sending or receiving transmission with the AP 110, both CDs 120 remain associated with the AP 110. Because the first CD 120a is in the sleep mode, the first CD 120a is consuming power at a slower rate, but may only be able to send/receive data with the AP 110 at a slower rate, than if the first CD 120a were in the active mode. Because the second CD 120b is in the active mode, the AP 110 may communicate with the second CD 120b without first sending a WUS frame; the second CD 120b is ready to send/receive transmissions 130 with the AP 110.

Figure 2:
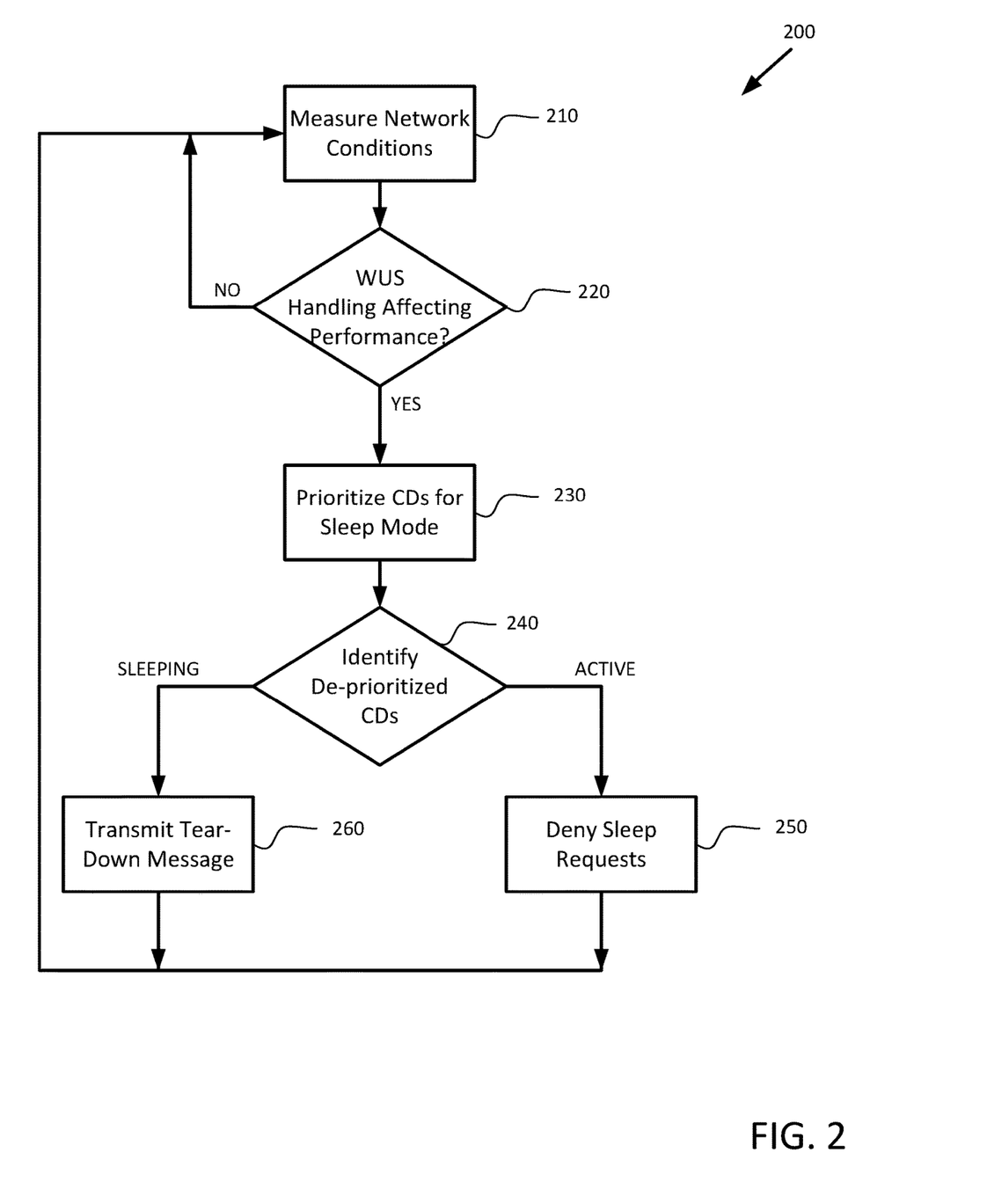
FIG. 2 is a flowchart of a method for managing sleep and active modes for one or more CDs connected with an AP, according to embodiments of the present disclosure.

FIG. 2 is a flowchart of a method 200 for managing sleep and active modes for one or more CDs 120 connected with an AP 110, according to embodiments of the present disclosure.

Method 200 begins with block 210, where the AP 110 measures network conditions. In various embodiments, the network conditions measured by the AP 110 include: a channel use rate for channels provided by the AP 110 for communication with connected CDs 120, a percentage of the channel usage attributed to transmissions 130 that include a WUS, downlink buffer capacity for CDs 120 that are capable of operating in a sleep mode, a latency sensitivity of applications for traffic held in the downlink buffers (for any connected CD).

In some embodiments, the AP 110 shares (and similarly receives) network conditions with neighboring APs (i.e., other APs within one-hop transmission range of the AP 110) or other APs in a shared networking environment. The shared network conditions may be used for load balancing, predictive analysis, and co-management of neighboring APs. For example, because CD can be moved from the range of one AP to another in a shared networking environment, when a first AP reports that networking conditions indicate that access to the sleep mode should be controlled, a second neighboring AP may preemptively begin restricting access to the sleep mode. In another example, because the ranges of neighboring APs can overlap, a first AP may restrict access to sleep mode when a second neighboring AP is experiencing network conditions that would benefit from reducing in the number of WUS frames transmitted even when not experiencing those conditions at the first AP to help reduce congestion in the shared range.

At block 220, the AP 110 determines whether WUSs (and sleep capable CDs 120) are negatively affecting active communication in the network or for individual CDs 120. In various embodiments, the AP 110 compares the network conditions measured in block 210 against various thresholds to determine whether the current networking conditions indicate that a sufficient number of WUS may be transmitted to disrupt the flow of data across the network. When the AP 110 determines that the current WUS handling scheme negatively affects performance, method 200 proceeds to block 230, otherwise method 200 returns to block 210 for the AP 110 to continue measuring network conditions.

At block 220, for example, the AP 110 may determine that when the overall channel usage rate is above a use threshold of X % (i.e., when more than X % of the available bandwidth or airtime is being used for transmissions 130) that the number of WUSs (potentially) needed to be sent could degrade performance for CDs 120 actively communicating with the AP 110. Similarly, the AP 110 may determine that when the number of WUS transmissions relative to non-WUS transmissions and/or to the total available bandwidth is above a WUS threshold that the number of WUSs (potentially) needed to be sent could degrade performance for CDs 120 actively communicating with the AP 110. In a further example, the AP 110 may determine that when a percent of a downlink buffer (for an individual CD 120 or the plurality of CDs 120 capable of sleep mode) is over a backlog threshold (e.g., when the downlink buffer is Z % full) that the number of WUSs (potentially) needed to be sent could degrade performance for CDs 120 actively communicating with the AP 110. Similarly, when the AP determines that a latency sensitivity of current traffic held in the downlink buffers in the AP 110 is above a sensitivity threshold that the number of WUSs (potentially) needed to be sent could degrade performance for CDs 120 actively communicating with the AP 110.

At block 230, the AP 110 evaluates various characteristics of the CDs 120 connected to the AP 110 to prioritize which CDs 120 are allowed to remain in the sleep mode or are allowed to transition to the sleep mode. The number of devices allowed to be in sleep mode at one time may vary depending on the threshold satisfied in block 220, and in various embodiments, the AP 110 uses several different thresholds to evaluate each network condition metric, which in turn affects how aggressively the AP 110 prioritizes or deprioritizes CDs 120 for sleep mode. For example, when 90% of the available bandwidth is in use, the AP 110 may permit up to 2X CDs 120 to enter sleep mode at one time, but when 95% of the available bandwidth is in use, the AP 110 may permit up to X CDs 120 to enter sleep mode at one time, and when 99% of the available bandwidth is in use, the AP may permit no CDs 120 to enter sleep mode. Accordingly, as network conditions become more crowded, the AP 110 allows fewer CDs 120 to enter sleep mode, but as network conditions become more permissive, the AP allows more CDs 120 to enter sleep mode. Because the AP 110 continuously monitors network conditions, and network traffic may occur in bursts, the AP 110 may maintain a given prioritization scheme for a predefined amount of time to avoid shifting back and forth between different schemes.

The AP 110 prioritizes or ranks the connected CDs 120 that are capable of sleep mode based on several criteria in a priority scheme which includes one or more of the following prioritization criteria. An operator may specify different preferences for how to combine two or more of the listed prioritization criteria, and may supply other prioritization criteria in addition to the example prioritization criteria listed herein. When applied, the prioritization criteria rank the CD 120 to enable the AP 110 to decide which CDs 120 to allow or deny access to sleep mode and thereby improve networking conditions that are negatively affected by excessive transmissions related to WUS and/or sleep requests One prioritization criterion can be how often an individual CD 120 has received WUSs over a given time window, so that a CD 120 cycling through the active and sleep modes is prioritized to be awakened or denied sleep mode. For example, a first CD 120a that is transitioned to the active mode more often or more frequently (e.g., stays in the sleep mode for less time) than a second CD 120b may be prioritized to remain awake or be awakened (i.e., is deprioritized for access to sleep mode).

One prioritization criterion can be how sensitive the applications running on the CDs 120 are to latency, so that CDs 120 running more latency-sensitive applications are prioritized to be awakened or denied sleep mode over CDs running less latency-sensitive applications. For example, a first CD 120a receiving video may be prioritized to remain awake or be awakened (i.e., is deprioritized for access to sleep mode) compared to a second CD 120b receiving text.

One prioritization criterion can be how recently the CD 120 transitioned to a current mode. For example, a first CD 120a that has been in a sleep mode for less time than a second CD 120b may be prioritized to remain in the sleep mode compared to the second CD 120b.

One prioritization criterion can be what mode the CD 120 is currently in, where CD 120 that are currently in the sleep mode may be allowed to remain in sleep mode while CD 120 that are currently in the active mode are denied permission to enter the sleep mode.

One prioritization criterion may be a power consumption rate of the CDs 120, in which CDs 120 with shorter remaining battery lives are prioritized for access to sleep mode over CDs 120 with longer remaining battery lives (or are using a non-battery power source such as a solar cell or a connection to an external electrical outlet or other power source).

One prioritization criterion may be a recharging likelihood of the CDs 120, in which CDs 120 expected to recharge sooner (or are currently recharging) are prioritized over CDs 120 expected to recharge later.

One prioritization criterion may be a recharging difficulty of the CDs 120, in which CDs 120 report a difficulty level in recharging a given CD 120. For example, an Internet of Things (IoT) device, sensor, or other battery-operated device deployed in an environment without a specific user may be prioritized for access to sleep mode over cellphones, tablets, or the like, which are normally carried or accessible by a user who can identify when the CD 120 needs to be recharged.

In various embodiments, a prioritization scheme for the thresholds and prioritization criteria is managed by a machine learning model trained with the networking conditions and reported disruptions or Quality of Service (QoS) reports from the AP 110 and/or CD 120. The machine learning model is trained based on historical conditions observed by the AP to detect when the level of network usage devoted to handing WUSs currently exceeds (or is predicted to exceed in a given time window) a threshold that affects the QoS provided to active devices. In various embodiments, the machine learning model monitors how much of the channel bandwidth or memory space on the AP 110 can be devoted to WUS processing without affecting the QoS provided to active devices. In some embodiments, the prioritization scheme can be fully or partially managed via a set of hard-coded rules (e.g., if device A is doing too much WUS then device B should be awakened too) in a network management rule set in addition to or instead of a machine learning model.

At block 240, the AP 110 identifies the CDs 120 that have been deprioritized for access to the sleep mode per block 230. When a given deprioritized CD 120 is currently awake, method 200 proceeds to block 250. When a given deprioritized CD 120 is currently sleeping, method 200 proceeds to block 260. The active CDs 120 that are not deprioritized (i.e., are prioritized) for access to the sleep mode continue to operate as normal, and the AP 110 can allow those CDs 120 to transition between the sleep and active modes as requested by the CDs 120. In some embodiments, the AP 110 sends a group WUS to all of the sleeping CDs 120 to transition all of the sleeping CDs 120 to the active mode, and then determines which CDs 120 to allow back to the sleep mode.

At block 250, when the deprioritized CD 120 is active, the AP 110 denies any requests from the deprioritized CD 120 to enter the sleep mode. In embodiments in which a given CD 120 that is deprioritized does not transmit a sleep request to the AP 110, the given CD 120 may not know that the AP 110 has deprioritized CD 120. In some embodiments, the AP 110 transmits a deprioritization message to the deprioritized CDs 120 so that those CDs 120 do not transmit sleep requests to the AP 110 for at least a specified time period or until a clear message (overriding the deprioritization message) is received from the AP 110. Method 200 may then return to block 210 for the AP 110 to continue measuring network conditions.

At block 260, when the deprioritized CD 120 is asleep, the AP 110 transmits a tear-down message to force the deprioritized CD 120 out of the sleep mode. In some embodiments, the AP 110 waits until the next downlink transmission 130 to the deprioritized CD 120 to include the tear-down message to the CD 120 in the transmission (or in a subsequent message) with the requested payload for the deprioritized CD 120. In some embodiments, the AP 110 transmits the tear-down message to the sleeping AP 110 based on bandwidth availability in the network regardless of whether other communications are scheduled for the given CD 120 being awakened. In various embodiments, the AP 110 may send individualized tear-down messages to individual CDs 120, or may send a group WUS to wake all or a subset of the sleeping CDs 120 via a single transmission. The tear-down message instructs the receiving CD 120 to transition from the sleep mode to the active mode and to remain in the active mode. In some embodiments, the tear-down message includes a wakefulness command that prevents the CD 120 from requesting to reenter the sleep mode for at least a specified time period or until a clear message (overriding the tear-down message) is received from the AP 110. Method 200 may then return to block 210 for the AP 110 to continue measuring network conditions.

Figure 3:
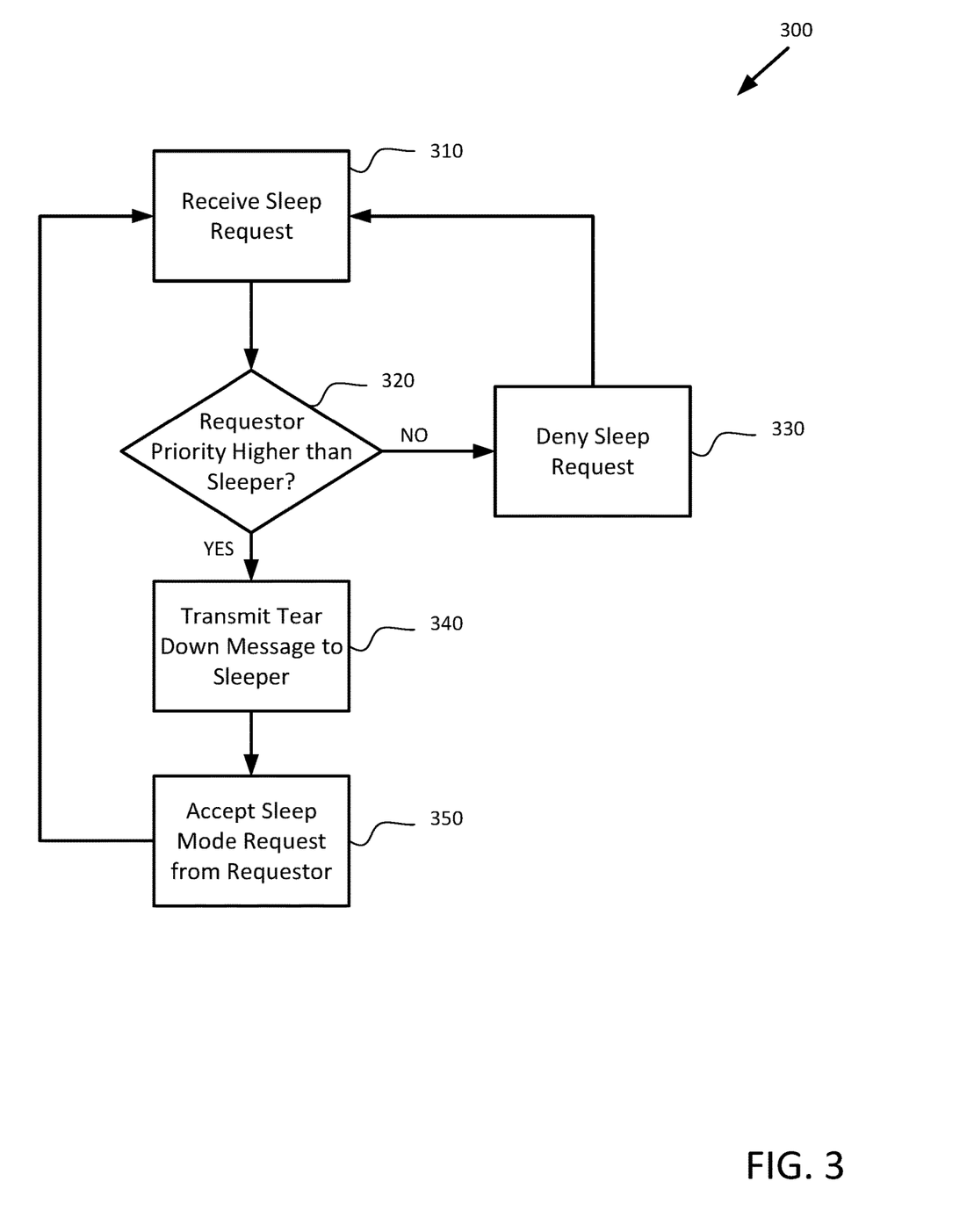
FIG. 3 is a flowchart of a method for managing a set number of CDs in a sleep state in a network, according to embodiments of the present disclosure.

FIG. 3 is a flowchart of a method 300 for managing a set number of CDs 120 in a sleep state in a network, according to embodiments of the present disclosure. In various embodiments, an AP 110 may determine that network conditions allow for up to a set number of CDs 120 to be permitted to enter or remain in a sleep mode, and any other CDs 120 connected to the AP 110 are to remain in or transition to an active mode. For example, the AP 110 may determine that no more than eight CDs 120 out of sixteen connected CDs 120 are allowed to be in the sleep mode at any given time. However, the CDs 120 that are in the sleep mode when the determination is made may not be the CDs 120 with the highest priority claim to be allowed to remain in sleep mode. Therefore, the AP 110 may manage the number of CDs 120 in sleep mode by waking a first CD 120*a* to permit a second CD 120*b* to sleep. Method 300 therefore begins at block 310, where a sleep mode request is received from a requestor CD 120.

At block 320, the AP 110 determines whether the requestor CD 120 from which the sleep mode request was received in block 310 has a higher priority to the sleep mode than a currently sleeping CD 120. In various embodiments, the relative priorities of two CDs 120 may be determined according to a ranking according to various prioritization criteria, such as those discussed in relation to block 230 of FIG. 2. Method 300 proceeds to block 330 when the requestor CD 120 has the same or a lower priority to sleep mode than the currently sleeping CDs 120. Method 300 proceeds to block 340 when the requestor CD 120 has a higher sleep priority than at least one currently sleeping CD 120.

At block 330, the AP 110 denies the sleep mode request. In various embodiments, the AP 110 sends a denial message to the requestor CD 120, which may also indicate a time period in which the requestor CD 120 is not allowed to send a subsequent sleep mode request. In various embodiments, the AP 110 may leave the sleep mode request unacknowledged (i.e., not transmitting a positive or negative response to the sleep mode request), thus leaving the sleep mode request as pending from the perspective of the requestor CD 120. Method 300 then returns to block 310, where the AP 110 waits to receive a subsequent sleep mode request from a CD 120.

At block 340, the AP 110 transmits a tear-down message to a sleeping CD 120. When more than one CD 120 with a lower priority to sleep mode than the requestor CD 120 is sleeping, the AP 110 may send tear-down messages to one or more of those sleeping CDs 120. For example, the AP 110 may wake a single sleeping CD 120 with the lowest priority among the sleeping CDs 120, all sleeping CDs 120 with lower priority than the requestor CD 120, or an intermediate number of CDs 120 that the AP 110 has sufficient bandwidth to wake without negatively affecting network performance. The tear-down message instructs the receiving CD 120 to transition from the sleep mode to the active mode, and may also indicate a time period in which the receiving CD 120 is not allowed to send a sleep mode request.

At block 350, the AP 110 accepts the sleep mode request from the requestor CD 120, and may transmit an acceptance response to the requestor CD 120 to allow the given CD 120 to deactivate a main radio 121, activate a wake-up radio 122, and perform other power saving activities while waiting to receive a WUS from the AP 110. Method 300 then returns to block 310, where the AP 110 waits to receive a subsequent sleep mode request from a CD 120.

Figure 4:
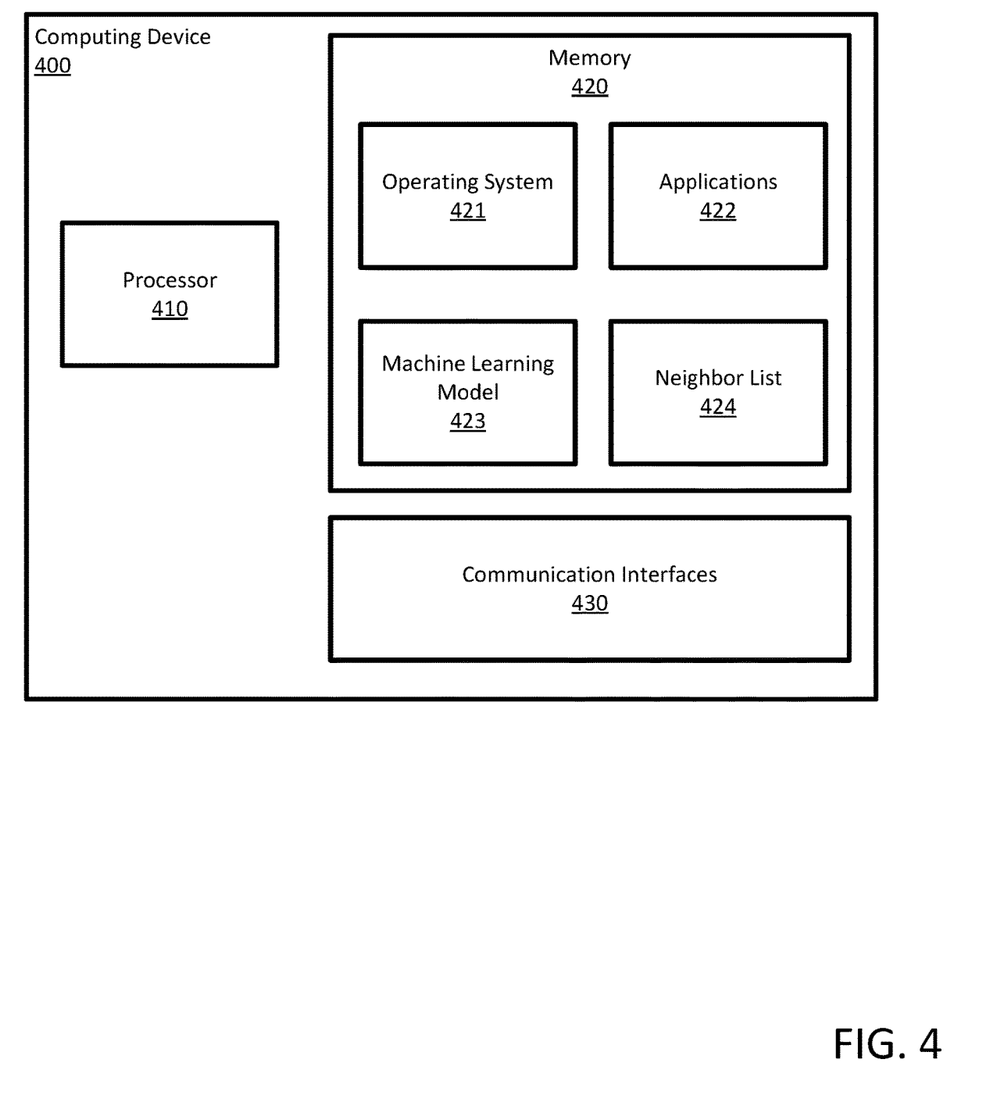
FIG. 4 illustrates hardware of a computing device, according to embodiments of the present disclosure.

FIG. 4 illustrates hardware of a computing device 400, as may be used in an AP 110 or a CD 120 described in the present disclosure. The computing device 400 includes a processor 410, a memory 420, and communication interfaces 430. The processor 410 may be any processing element capable of performing the functions described herein. The processor 410 represents a single processor, multiple processors, a processor with multiple cores, and combinations thereof. The communication interfaces 430 facilitate communications between the computing device 400 and other devices. The communications interfaces 430 are representative of wireless communications antennas, including those used for the main radio 121 and wake-up radio 122, and various wired communication ports. The memory 420 may be either volatile or non-volatile memory and may include RAM, flash, cache, disk drives, and other computer readable memory storage devices. Although shown as a single entity, the memory 420 may be divided into different memory storage elements such as RAM and one or more hard disk drives.

As shown, the memory 420 includes various instructions that are executable by the processor 410 to provide an operating system 421 to manage various functions of the computing device 400 and one or more applications 422 to provide various functionalities to users of the computing device 400, which include one or more of the functions and functionalities described in the present disclosure. Additionally, the memory 420 can includes one or more of a machine learning model 423 to identify, based on historical conditions, when to manage access to the sleep mode, and a neighbor list 424 indicating which APs to share observed networking conditions with.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   measuring network conditions for a first Access Point (AP) serving a plurality of CDs (Client Devices) configured to operate in one of a sleep mode and an active mode;
   in response to detecting, based on the measured network conditions, an amount of network usage devoted to transitioning members of the plurality of CDs from the sleep mode to the active mode satisfies a threshold:
   identifying a first subset of CDs from the plurality of CDs that are in the sleep mode;
   identifying a given CD from the first subset of CDs to transition to the active mode; and
   transmitting a tear-down message to the given CD that instructs the given CD to transition from the sleep mode to the active mode,
   wherein the given CD is identified at least based on a priority scheme that ranks the given CD higher than remaining CDs of the first subset based on a first amount of Wake Up Signals (WUSs) received by the given CD over a given time window being more than a second amount WUSs received by the remaining CDs.

2. The method of claim 1, wherein the tear-down message includes a first WUS and a first wakefulness command that prevents the given CD from reentering the sleep mode for at least a predefined amount of time.

3. The method of claim 1, wherein the tear-down message is queued until a next message is transmitted to the given CD, wherein the next message includes a requested payload for an application running on the given CD and a command that prevents the given CD from reentering the sleep mode for at least a predefined amount of time.

4. The method of claim 1, wherein the given CD is identified based on a priority scheme in the first subset that ranks the CDs to wake up based on:
   how sensitive applications running on the CDs are to latency, wherein CDs running more sensitive applications are prioritized over CDs running less sensitive applications;
   a power consumption rate of the CD, wherein CDs with shorter remaining battery life are prioritized over CDs with longer remaining battery life; and
   a recharging likelihood or difficulty of the CD, wherein CDs expected to recharge sooner are prioritized over CDs expected to recharge later.

5. The method of claim 1, wherein detecting the amount of network usage devoted to transitioning members of the plurality of CDs from the sleep mode to the active mode satisfies the threshold include at least one of:
   detecting a channel usage rate above a use threshold;
   detecting a percent of channel usage due to Wake Up Signals above a WUS threshold;
   detecting a downlink buffer in the AP for the CD over a backlog threshold; and detecting a latency sensitivity of a current traffic held in the downlink buffers in the AP is above a sensitivity threshold.

6. The method of claim 1, after detecting the amount of network usage devoted to transitioning members of the plurality of CDs from the sleep mode to the active mode satisfies the threshold:
   receiving a sleep request from a second CD currently in the active mode; and
   denying the sleep request to force the second CD to remain in the active mode for at least a predefined amount of time.

7. The method of claim 1, after detecting the amount of network usage devoted to transitioning members of the plurality of CDs from the sleep mode to the active mode satisfies the threshold:
   receiving a sleep request from a second CD currently in the active mode; in response to identifying that the second CD has a higher sleep priority than a third CD that is currently in the sleep mode;
   accepting the sleep request from the second CD to permit the second CD to enter the sleep mode; and transmitting a tear-down message to the third CD that forces the third CD from the sleep mode to the active mode.

8. The method of claim 1, wherein detecting whether the amount of network usage devoted to transitioning members of the plurality of CDs from the sleep mode to the active mode satisfies the threshold includes predictive analysis based on the network conditions of a second AP neighboring the first AP.

9. The method of claim 1 in which detecting whether the amount of network usage devoted to transitioning members of the plurality of CDs from the sleep mode to the active mode satisfies the threshold includes predictive analysis based on historical conditions observed by the first AP and at least one of a machine learning model or a network management rule set.

10. A non-transitory computer readable storage device including instructions that when performed by a processor perform an operation comprising:
    measuring network conditions for a first Access Point (AP) serving a plurality of CDs (Client Devices) configured to operate in one of a sleep mode and an active mode;
    in response to detecting, based on the measured network conditions, an amount of network usage devoted to transitioning members of the plurality of CDs from the sleep mode to the active mode satisfies a threshold:
identifying a first subset of CDs from the plurality of CDs that are in the sleep mode;
identifying a given CD from the first subset of CDs to transition to the active mode; and
transmitting a tear-down message to the given CD that instructs the given CD to transition from the sleep mode to the active mode,
wherein the given CD is identified at least based on a priority scheme that ranks the given CD higher than remaining CDs of the first subset based on a first amount of Wake Up Signals (WUSs) received by the given CD over a given time window being more than a second amount WUSs received by the remaining CDs.

11. The non-transitory computer readable storage device of claim 10, wherein the tear-down message includes a first WUS and a first wakefulness command that prevents the given CD from reentering the sleep mode for at least a predefined amount of time.

12. The non-transitory computer readable storage device of claim 10, wherein the tear-down message is queued until a next message is transmitted to the given CD, wherein the next message includes a requested payload for an application running on the given CD and a command that prevents the given CD from reentering the sleep mode for at least a predefined amount of time.

13. The non-transitory computer readable storage device of claim 10, wherein the given CD is identified based on a priority scheme in the first subset that ranks the CDs to wake up based on:
how sensitive applications running on the CDs are to latency, wherein CDs running more sensitive applications are prioritized over CDs running less sensitive applications;
a power consumption rate of the CD, wherein CDs with shorter remaining battery life are prioritized over CDs with longer remaining battery life; and
a recharging likelihood of the CD, wherein CDs expected to recharge sooner are prioritized over CDs expected to recharge later.

14. The non-transitory computer readable storage device of claim 10, wherein the operation includes, after detecting the amount of network usage devoted to transitioning members of the plurality of CDs from the sleep mode to the active mode satisfies the threshold:
receiving a sleep request from a second CD currently in the active mode; and
denying the sleep request to force the second CD to remain in the active mode for at least a predefined amount of time.

15. The non-transitory computer readable storage device of claim 10, wherein the operation comprises, after detecting the amount of network usage devoted to transitioning members of the plurality of CDs from the sleep mode to the active mode satisfies the threshold:
receiving a sleep request from a second CD currently in the active mode;
in response to identifying that the second CD has a higher sleep priority than a third CD that is currently in the sleep mode;
accepting the sleep request from the second CD to permit the second CD to enter the sleep mode; and transmitting a tear-down message to the third CD that forces the third CD from the sleep mode to the active mode.

16. A device, comprising: a processor; and a memory storage device including instructions that when executed by the processor enable the processor to perform an operation that includes:
measuring network conditions for a first Access Point (AP) serving a plurality of CDs (Client Devices) configured to operate in one of a sleep mode and an active mode;
in response to detecting, based on the measured network conditions, an amount of network usage devoted to transitioning members of the plurality of CDs from the sleep mode to the active mode satisfies a threshold:
identifying a first subset of CDs from the plurality of CDs that are in the sleep mode;
identifying a given CD from the first subset of CDs to transition to the active mode; and
transmitting a tear-down message to the given CD that instructs the given CD from the sleep mode to the active mode,
wherein the given CD is identified at least based on a priority scheme that ranks the given CD higher than remaining CDs of the subset based on amount of Wake Up Signals (WUSs) received by the given CD over a given time window being more than amount WUSs received by the remaining CDs.

17. The device of claim 16, wherein the tear-down message includes a first WUS and a first wakefulness command that prevents the given CD from reentering the sleep mode for at least a predefined amount of time.

18. The device of claim 16, wherein the tear-down message is queued until a next message is transmitted to the given CD, wherein the next message includes a requested payload for an application running on the given CD and a command that prevents the given CD from reentering the sleep mode for at least a predefined amount of time.

19. The device of claim 16, wherein the operation further includes, after detecting the amount of network usage devoted to transitioning members of the plurality of CDs from the sleep mode to the active mode satisfies the threshold:
receiving a sleep request from a second CD currently in the active mode; and
denying the sleep request to force the second CD to remain in the active mode for at least a predefined amount of time.

20. The device of claim 16, wherein the operation further includes, after detecting the amount of network usage devoted to transitioning members of the plurality of CDs from the sleep mode to the active mode satisfies the threshold:
receiving a sleep request from a second CD currently in the active mode; in response to identifying that the second CD has a higher sleep priority than a third CD that is currently in the sleep mode;
accepting the sleep request from the second CD to permit the second CD to enter the sleep mode; and
transmitting a tear-down message to the third CD that forces the third CD from the sleep mode to the active mode.

\* \* \* \* \*

UNITED STATES PATENT AND TRADEMARK OFFICE
CERTIFICATE OF CORRECTION

PATENT NO. : 11,089,501 B1  
APPLICATION NO. : 16/750994  
DATED : August 10, 2021  
INVENTOR(S) : Pooya Monajemi et al.

Page 1 of 1

It is certified that error appears in the above-identified patent and that said Letters Patent is hereby corrected as shown below:

In the Claims

Column 11, Line 56, Claim 1, after "amount" insert -- of --, therefor.

Column 13, Line 15, Claim 10, after "amount" insert -- of --, therefor.

Column 14, Line 25, Claim 16, after "the" insert -- first --, therefor.

Column 14, Line 25, Claim 16, after "on" insert -- a first --, therefor.

Column 14, Line 27, Claim 16, after "than" insert -- a second --, therefor.

Column 14, Line 27, Claim 16, after "amount" insert -- of --, therefor.

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*